(12) United States Patent
Kanagala et al.

(10) Patent No.: US 7,609,621 B1
(45) Date of Patent: Oct. 27, 2009

(54) AUTOMATIC PROTECTION NETWORK SWITCHING

(76) Inventors: Sameer Kanagala, 640 Clyde Ct., Mountain View, CA (US) 94043; Jan Medved, 640 Clyde Ct., Mountain View, CA (US) 94043; Alex Dadnam, 640 Clyde Ct., Mountain View, CA (US) 94043

( * ) Notice: Subject to any disclaimer, the term of this patent is extended or adjusted under 35 U.S.C. 154(b) by 717 days.

(21) Appl. No.: 10/776,460

(22) Filed: Feb. 10, 2004

(51) Int. Cl.
*G01R 31/04* (2006.01)
(52) U.S. Cl. .................................. 370/227; 370/228
(58) Field of Classification Search .......... 370/225–228
See application file for complete search history.

(56) References Cited

U.S. PATENT DOCUMENTS

| | | | |
|---|---|---|---|
| 5,193,086 A * | 3/1993 | Satomi et al. ............... 370/228 |
| 5,216,666 A * | 6/1993 | Stalick ....................... 370/222 |
| 6,195,330 B1* | 2/2001 | Sawey et al. ............... 370/220 |
| 6,196,330 B1* | 3/2001 | Matthias et al. ............. 173/48 |
| 6,332,198 B1* | 12/2001 | Simons et al. ................. 714/6 |
| 6,574,477 B1* | 6/2003 | Rathunde ................... 455/453 |
| 6,868,057 B1* | 3/2005 | Sha ........................... 370/216 |
| 2003/0117952 A1* | 6/2003 | Ueno et al. ................. 370/228 |
| 2003/0165115 A1* | 9/2003 | Sutoh et al. ................. 370/216 |
| 2004/0086003 A1* | 5/2004 | Natarajan et al. ........... 370/545 |

* cited by examiner

*Primary Examiner*—Kwang B Yao
*Assistant Examiner*—Andrew Lai (57) ABSTRACT

A method of protecting a protected link is disclosed. The method includes connecting traffic from a service module to a first physical module having a link layer framer that is connected to a protected egress link. The traffic is connected through the first physical module through a pooling switch to a second physical module that is connected to an alternate egress link.

66 Claims, 6 Drawing Sheets

AUTOMATIC PROTECTION NETWORK SWITCHING

FIELD OF THE INVENTION

The present invention relates generally to network switching. More specifically, automatic protection switching is disclosed.

BACKGROUND OF THE INVENTION

Protection of data traffic is an increasingly important technical requirement. For example, it is important to businesses that their network connections do not fail as more and more commerce is conducted using electronic communication systems. Currently, automatic protection systems for network connections utilize data traffic channels each with their own queues. These queues can be large and are not synchronized between the protected traffic channel and the protecting traffic channel. Thus, if the protected traffic channel fails and the protecting traffic channel takes over, there can be either a loss or repeat of traffic transmitted or received over the channel. These losses or repeats of traffic are not handled well by the network and often fall outside the specifications of the network as a whole. It would be helpful if automatic protection systems could be engineered to provide better protection of traffic within the capabilities and specifications of the network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
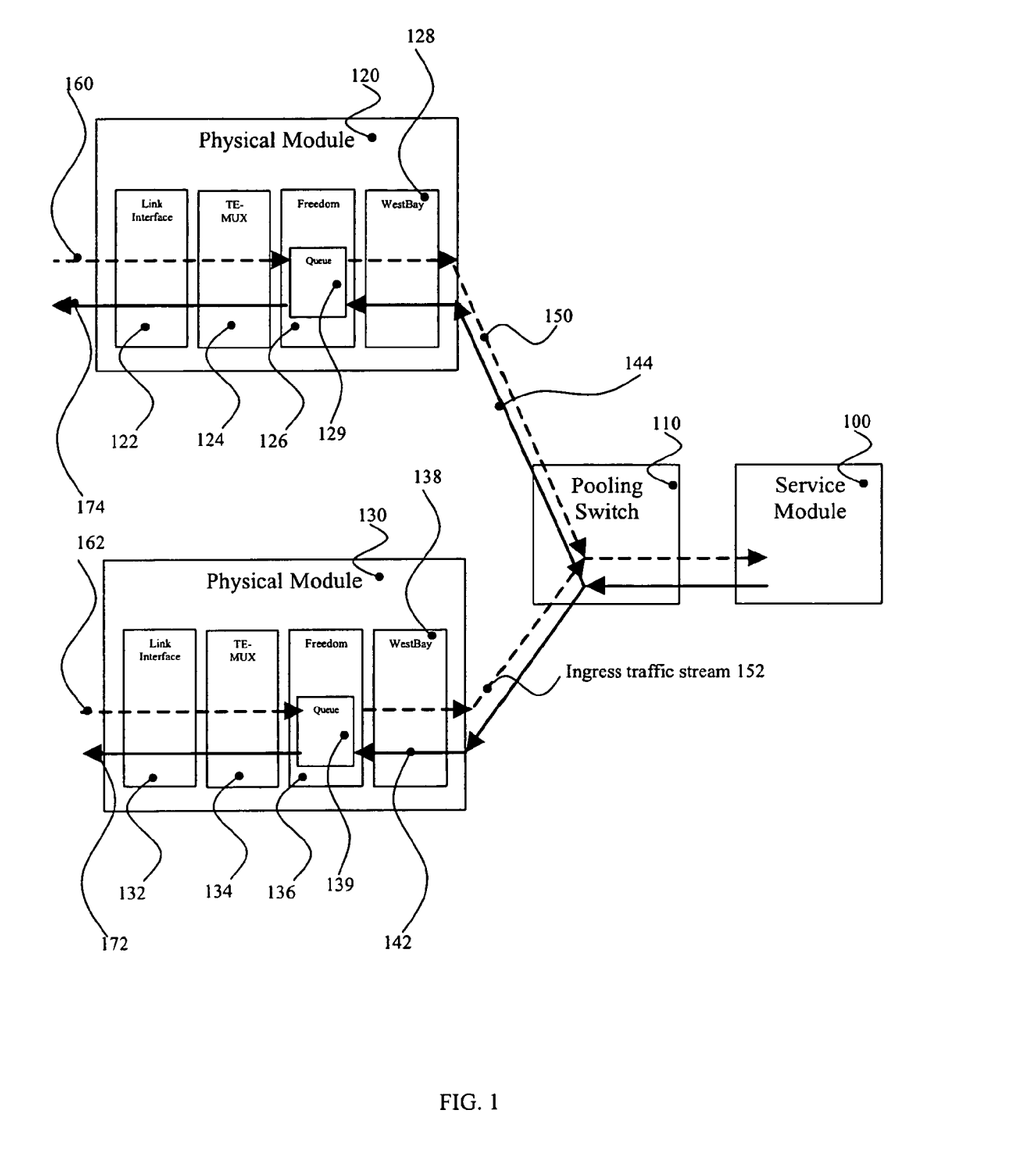
FIG. 1 shows a block diagram of a network switching system.

FIG. 1 shows a block diagram of a network switching system. The system includes physical modules 120 and 130. An input traffic stream coming from an ingress link 160 through physical module 120 is directed through another physical module to an egress link. For example, the output traffic stream could be switched through physical module 120 to egress link 174.

In some embodiments, a network switching system with an automatic protection system for its ingress traffic has two simultaneous links that can be used to protect the incoming traffic streams in the event that one of the ingress links fails. In the embodiment shown in FIG. 1, the system takes two input traffic streams: the protected one (ingress traffic stream 150) coming from ingress link 160 through physical module 120 and the protecting one (ingress traffic stream 152) coming from ingress link 162 through physical module 130. If the system is operating normally without failure, the traffic stream from the protected stream is switched to output through another physical module to an egress link. For example, the output traffic stream could go through physical module 120 to egress link 174 along egress traffic stream 144. If the protected traffic stream fails, then the protecting stream is used as the input traffic stream and switched to the other physical module and output across an egress link.

Pooling switch 110 selects whether the protected traffic stream or the protecting traffic stream is to be passed on to the service module 100. The pooling switch can be a packet switch, a multiplexing switch, a time division multiplexing switch, or any other switch capable of directing multiple input traffic streams. The service module decides from information within the input traffic stream where to output the traffic stream and instructs the pooling switch to make the appropriate connections. In some embodiments, the connections are static and are done by provisioning. In some embodiments, the service module decision is based on the International Standard Organization's Open System Interconnect (ISO/OSI) layer 2 information that is found in the traffic stream. For example, the information may be an Ethernet address or a media access control (MAC) address.

In some embodiments, a network switching system with an automatic protection system for its egress traffic has two simultaneous links that can be used to protect the outgoing traffic streams in the event that one of the egress links fails. In the embodiment shown in FIG. 1, the system has two output traffic streams: the protected one (egress traffic stream 144) going to egress link 174 through physical module 120 and the protecting one (egress traffic stream 142) going to egress link 172 through physical module 130. If the system is operating normally without failure, the traffic stream from an input traffic stream (for example, ingress traffic stream 150) is switched to both the protected and protecting output traffic streams.

Pooling switch 110 selects whether the traffic stream from service module 100 is passed on to the protected output traffic stream or the protecting output traffic stream. The pooling switch can be a packet switch, a multiplexing switch, a time division multiplexing switch, or any other switch capable of directing multiple output traffic streams.

In some embodiments, submodules are included within the physical modules. For example, in the embodiment shown, ingress traffic stream 150 from ingress link 160 first passes through a link interface module 122. Link interface module 122 is an optical or electrical link interface module used to connect to a type of link such as a OC-198, OC-48, OC-12, OC-3, 10/100 ethernet, gigabit Ethernet, DS1, or DS3 or other link. The ingress traffic stream 150 then passes through a TE-MUX 124 module. This TE-MUX module is a multiplexer/demultiplexer of ISO/OSI layer 1 protocols (e.g. DS1 into DS3, E1 into SONET, E1 into TU2, DS3 into SONET frames, or OC-3 SONET frames into OC-48 frames). The ingress traffic stream 150 then passes through a Freedom 126 module. This Freedom module is a link layer processor. This module may, for example, frame the traffic stream for the High-level Data Link Control (HDLC), circuit emulation, or Asynchronous Transfer Mode (ATM) based protocols. Within this module, as part of the link layer framing, ingress traffic stream 150 passes through a queue 129, which may store up to 5 seconds of traffic. After the Freedom module, ingress traffic stream 150 passes through a WestBay module 128. This WestBay module places the traffic in a proper form for pooling switch 110. The form of the traffic is the framing method generic framing protocol (GFP). In another embodiment, the traffic framing method is packet over SONET (POS).

Each physical module has a queue with up to 5 seconds of traffic storage. However, at any given time the amount of traffic stored in the queue is not synchronized between any two physical modules, so if two physical modules receive the same ingress or egress traffic there could be a synchronization difference between the two ingress or egress traffic streams that is as large as the queue. In other words, if the queue has up to 5 seconds of traffic in it, the synchronization error between the two traffic streams could be as large as 5 seconds. This synchronization error is an issue when one of the traffic streams is being used as a back-up traffic stream as part of an automatic protection system (APS) or other system with strict requirements for switching to a backup. In the event of a failure of the traffic stream, the network switching system will switch to the back-up traffic stream. However, because the traffic is not synchronized, there may be either a drop-out or repeat of the traffic equal to the synchronization difference. A network system may not handle these drop-out or repeats well. In some situations, repeats of traffic are worse than drop-outs.

Figure 2:
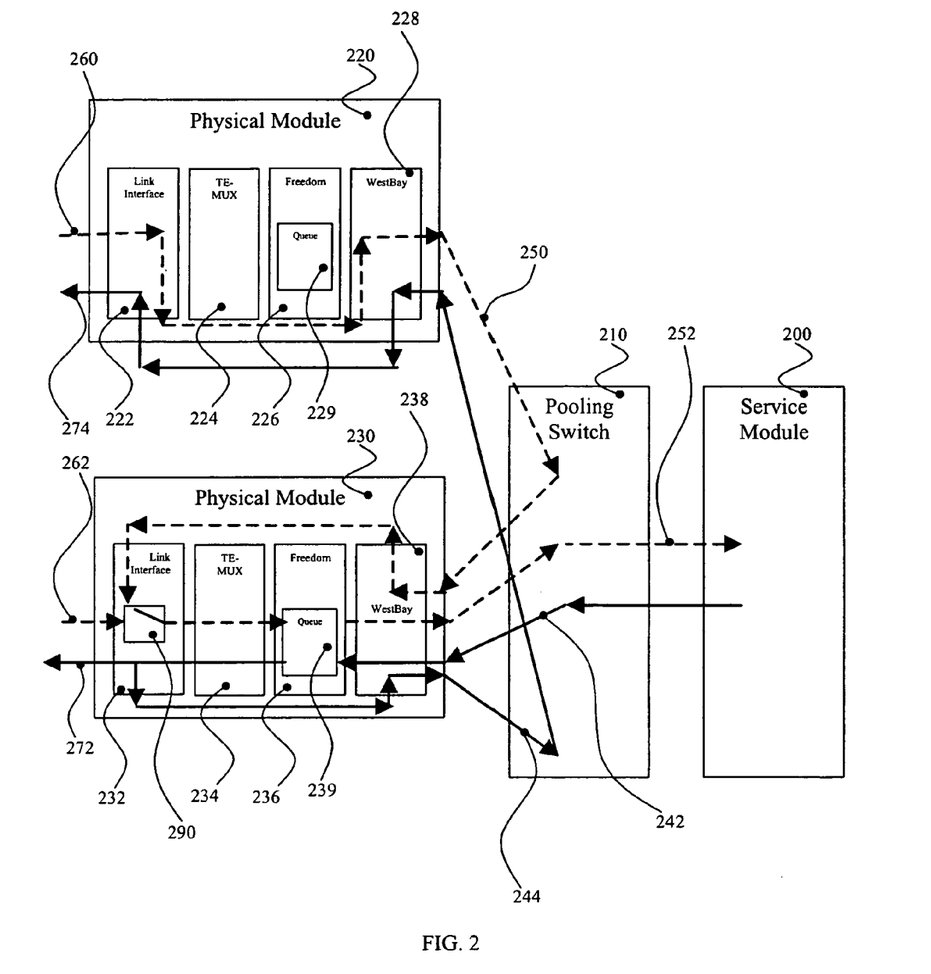
FIG. 2 shows one embodiment of a network switch that does not have a large synchronization difference between two egress/ingress traffic streams.

FIG. 2 shows one embodiment of a network switch that does not have a large synchronization difference between two egress traffic streams. In this embodiment, egress traffic stream 242 flows first from service module 200 to pooling switch 210. Next, egress traffic stream 242 is directed to physical module 230 where it flows through WestBay module 238, Freedom module 236 (with its queue 239), TE-MUX module 234, and link interface module 232 before going out egress link 272. A second traffic stream is created in link interface module 232 by outputting the same traffic to both the egress link 272 as well as along egress traffic stream 244. Egress traffic stream 244 travels back through WestBay module 238 and is switched by pooling switch 210 toward physical module 220. Egress traffic stream 244 flows through WestBay module 228 and then through link interface module 222 to egress link 274. In this case, all the traffic flows through the same queue 239 in Freedom module 236. The synchronization difference between the traffic coming out egress link 272 and egress link 274 is then solely due to the time to flow along egress traffic stream 244. This time can be easily made to be less than the 50 ms requirement of some network specifications. In this embodiment, if the traffic flowing through egress link 272 failed, an APS could switch to the traffic flowing through egress link 274. In this case, the synchronization difference between the two traffic flows does not have a drop-out or repeat larger than the network can handle. In some embodiments, the synchronization difference is smaller than the specification requirement of less than 50 ms. In some embodiments, the system behaves in a manner to the user as if there is no synchronization difference between the two traffic flows.

FIG. 2 also shows an embodiment of a network switch that does not have a large synchronization difference between two ingress traffic streams. Ingress traffic first enters from ingress link 262 and flows through link interface module 232, TE-MUX module 234, Freedom module 236 (with its queue 239), and WestBay module 238 before leaving physical module 230. Ingress traffic stream 252 next flows through pooling switch 210 and finally to service module 200. Another ingress traffic stream enters ingress link 260. Ingress traffic stream 250 flows through link interface module 222 and WestBay module 228 before leaving physical module 220. Ingress traffic stream 250 then is switched through pooling switch 210 to physical module 230. Ingress traffic stream then flows through WestBay module 238 to the link interface 232. The link interface 232 can choose using switch 290 either the traffic flow from ingress link 260 or ingress link 262 to flow through TE-MUX module 234, Freedom module 236 (with its queue 239), and WestBay module 238. This traffic then ultimately flows through pooling switch 220 to service module 200. If ingress traffic through ingress link 260 and ingress link 262 are synchronized, then the synchronization difference will be the time for ingress traffic stream 250 to travel from ingress link 260 to link interface 232 in physical module 230. This synchronization difference can be less than the 50 ms requirement of some network specifications. In this embodiment, if the traffic flowing through ingress link 262 failed, an APS could switch to the traffic flowing through ingress link 260. In this case, the synchronization difference between these two traffic flows does not have a drop-out or repeat larger than the network can handle. In some embodiments, the synchronization difference is smaller than the specification requirement of less than 50 ms. In some embodiments, the system behaves in a manner to the user as if there is no synchronization difference between the two traffic flows.

In other embodiments of a network switch that does not have a large synchronization difference between two egress traffic streams, pooling switch 210 is not the only pooling switch. A first pooling switch handles traffic only going from a physical module to another physical module. A second pooling switch handles traffic between service module 200 and a physical module. In one embodiment, ingress traffic stream 250 or egress traffic stream 244 are handled by the first pooling switch and ingress traffic stream 252 and egress traffic stream 242 are handled by the second pooling switch.

Figure 3:
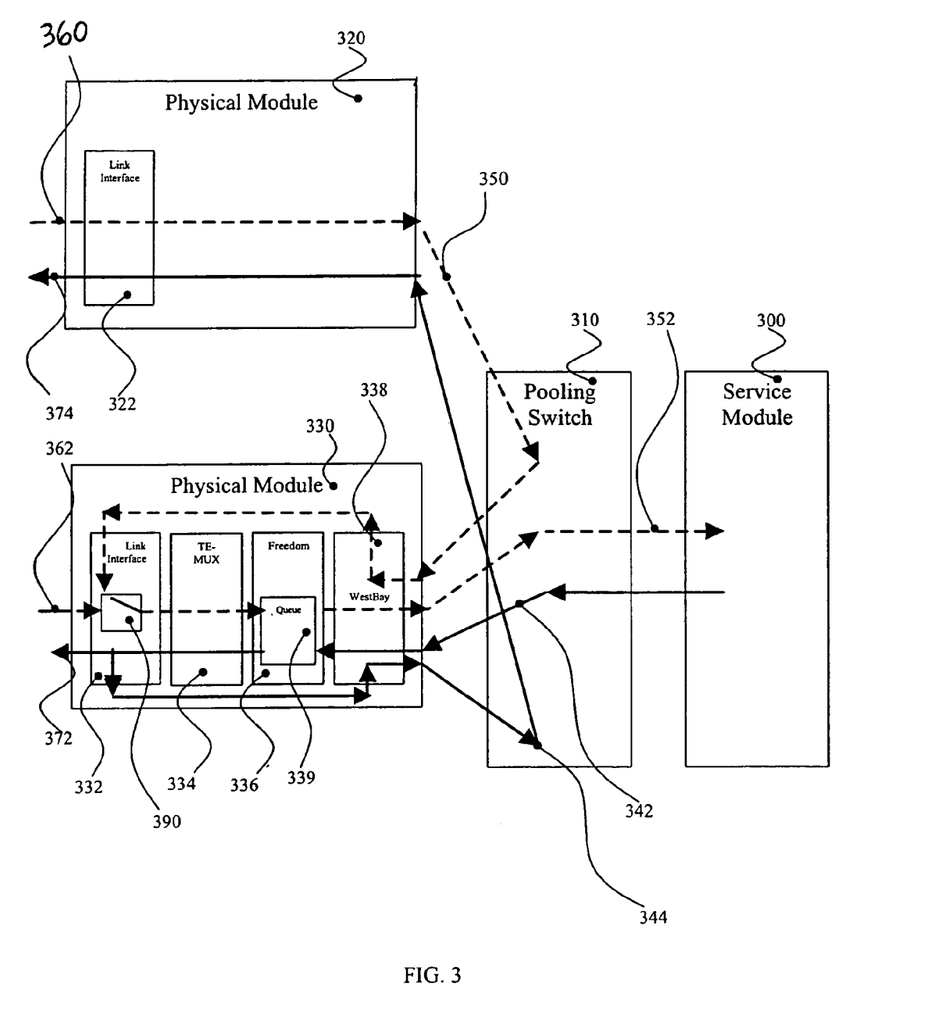
FIG. 3 shows a reduced cost embodiment of a network switch that does not have a large synchronization difference between two egress/ingress traffic streams.

FIG. 3 shows a reduced cost embodiment of a network switch that does not have a large synchronization difference between two egress traffic streams. In this embodiment, the egress traffic stream 342 flows first from service module 300 to pooling switch 310. Next, the egress traffic stream is directed to physical module 330 where it flows through WestBay module 338, Freedom module 336 (with its queue 339), TE-MUX module 334, and link interface module 332 before going out egress link 372. A second traffic stream is created in link interface module 332 by outputting the same traffic to both egress link 372 as well as along egress traffic stream 344. Egress traffic stream 344 travels back through WestBay module 338 and is switched by pooling switch 310 toward physical module 320. Egress traffic stream 344 flows through link interface module 322 to egress link 374. Physical module 320 has fewer components and therefore should have a lower cost. In this case, all the traffic flows through the same queue 339 in Freedom module 336. The synchronization difference between the traffic coming out egress link 372 and egress link 374 is then solely due to the time to flow along egress traffic stream 344. This time can be easily made to be less than the 50 ms requirement of some network specifications. In this embodiment, if the traffic flowing through egress link 372 failed, an APS could switch to the traffic flowing through egress link 374. In this case, the synchronization difference between these two traffic flows will not have a drop-out or repeat larger than the network can handle. Also, the synchronization difference can be smaller than the specification requirement of less than 50 ms.

FIG. 3 also shows a reduced cost embodiment of a network switch that does not have a large synchronization difference between two ingress traffic streams. Ingress traffic first enters from ingress link 362 and flows through link interface module 332, TE-MUX module 334, Freedom module 336 (with its queue 339), and WestBay module 338 before leaving physical module 330. The ingress traffic stream 352 next flows through pooling switch 310 and finally to service module 300. Another ingress traffic stream enters ingress link 360. Ingress traffic stream 350 flows through link interface module 322 and then leaves physical module 320. Physical module 320 has fewer components and therefore should have a lower cost. Ingress traffic stream 350 then is switched through pooling switch 310 to physical module 330. Ingress traffic stream then flows through WestBay module 338 to link interface 332. Link interface 332 can choose using switch 390 either the traffic flow from ingress link 360 or ingress link 362 to flow through TE-MUX module 334, Freedom module 336 (with its queue 339), and WestBay module 338. This traffic then ultimately flows through pooling switch 320 to service module 300. If ingress traffic through ingress link 360 and ingress link 362 are synchronized, then the synchronization difference will be the time for ingress traffic stream 350 to travel from ingress link 360 to link interface 332 in physical module 330. This synchronization difference can be easily made to be less than the 50 ms requirement of some network specifications. In this embodiment, if the traffic flowing through ingress link 362 failed, an APS could switch to the traffic flowing through ingress link 360. In this case, the synchronization difference between these two traffic flows will not have a drop-out or repeat larger than the network can handle. Also, the synchronization difference can be smaller than the specification requirement of less than 50 ms.

In another embodiment of a reduced cost network switch that does not have a large synchronization difference between two egress traffic streams, the pooling switch 310 is not only one pooling switch. A first pooling switch handles traffic only going from a physical module to another physical module. A second pooling switch handles traffic between service module 300 and a physical module. For example, ingress traffic stream 350 or egress traffic stream 344 is handled by the first pooling switch and ingress traffic stream 352 and egress traffic stream 342 is handled by the second pooling switch.

Figure 4:
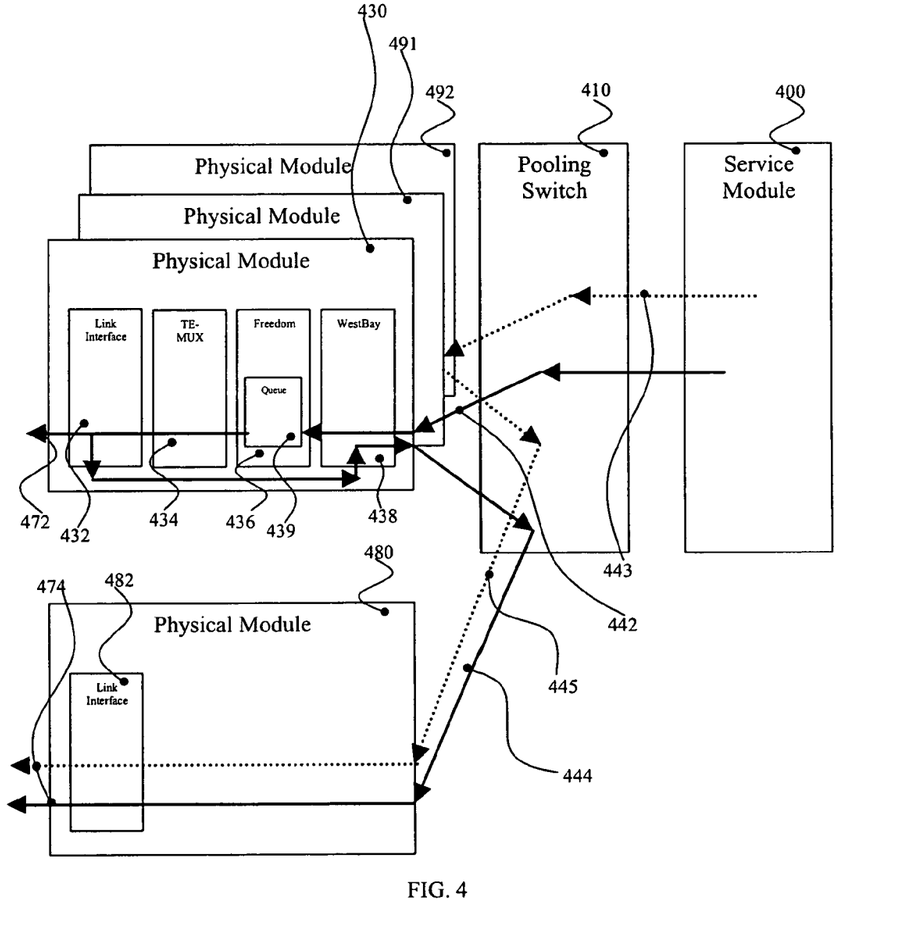
FIG. 4 shows a further cost reduced embodiment of a network switch that does not have a large synchronization difference between multiple egress traffic streams.

FIG. 4 shows a further cost reduced embodiment of a network switch that does not have a large synchronization difference between multiple egress traffic streams. In this embodiment, egress traffic stream 442 flows first from service module 400 to pooling switch 410. Next, egress traffic stream 442 is directed to physical module 430 where it flows through WestBay module 438, Freedom module 436 (with its queue 439), TE-MUX module 434, and link interface module 432 before going out egress link 472. A second traffic stream is created in link interface module 432 by outputting the same traffic to both egress link 472 as well as along egress traffic stream 444. Egress traffic stream 444 travels back through WestBay module 438 and is switched by pooling switch 410 toward physical module 480. The egress traffic stream 444 flows through link interface module 482 to one of the egress links 474. Notice that physical module 480 has fewer components and therefore should have a lower cost. Additionally, physical module 491 producing egress traffic stream 445 could use one of the egress links 474 as an alternate or back-up. Similarly, physical module 492 producing an egress traffic stream (not shown in FIG. 4) could also use one of egress links 474 (also not shown in FIG. 4) as an alternate or back-up. In a similar way, multiple egress traffic streams could use a physical module as an alternate or back-up.

In another embodiment, pooling switch 410 is not only one pooling switch. A first pooling switch could handle traffic only going from a physical module to another physical module. A second pooling switch could handle traffic between the service module 400 and a physical module.

Figure 5:
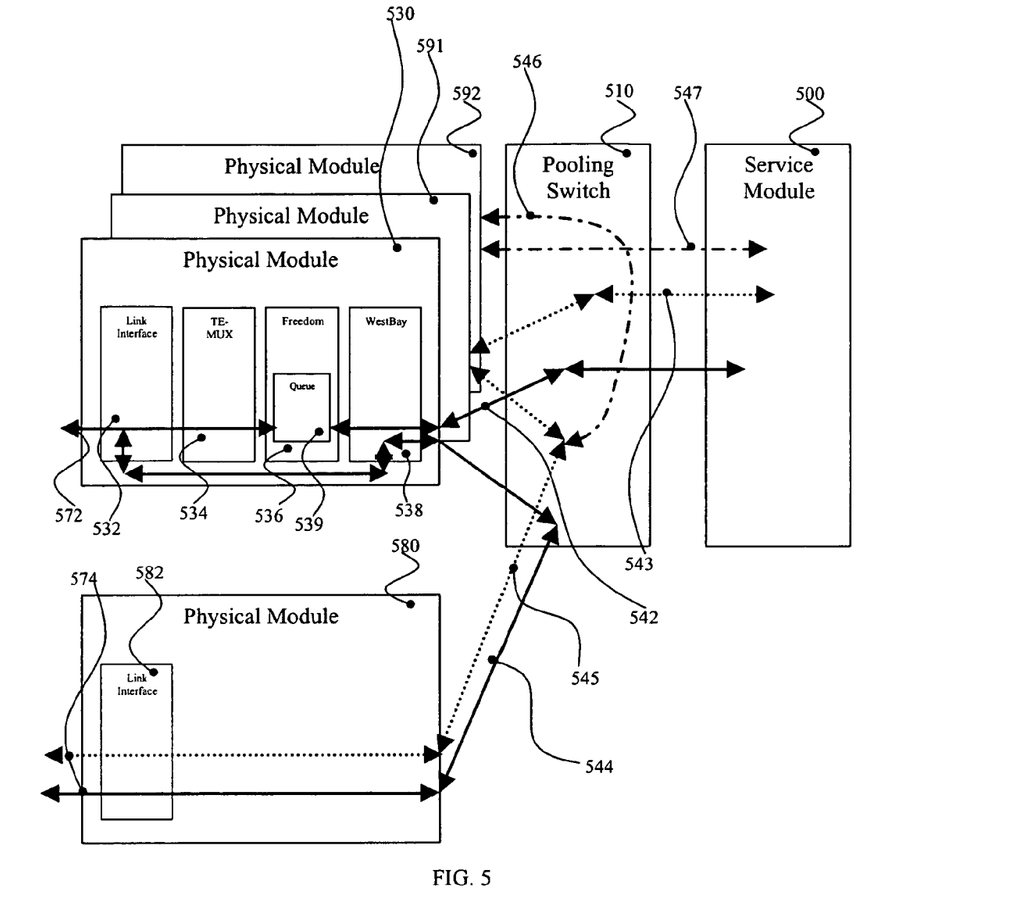
FIG. 5 shows another embodiment of a network switch.

FIG. 5 shows another embodiment of a network switch. In this embodiment, egress/ingress traffic stream 542 going to and from service module 500, through physical module 530 to egress/ingress link 572 has an alternate or back-up through egress/ingress traffic stream 544 and one of the egress/ingress links 574. Similarly, egress/ingress traffic stream 543 going to and from service module 500, through physical module 591 to egress/ingress link (not shown in FIG. 5) has an alternate or back-up through egress/ingress traffic stream 545 and one of the egress/ingress links 574. To provide an APS for the physical modules (for example, physical modules 530 or 591), pooling switch 510 can switch to physical module 592. This is an example of 1:1 or 1+1 redundancy for the physical modules like 592 and 591. In other words, one physical module (physical module 592) is a back-up for another physical module (in this physical module 591). So, if for example, physical module 530 failed, pooling switch 510 could use back-up egress/ingress links 574 and direct the traffic along egress/ingress traffic stream 546 to physical module 592 and then again through the pooling switch along egress/ingress traffic stream 547 to service module 500. In some embodiments, the pooling switch 510 directs parts of the egress/ingress traffic stream 545 to physical modules 591 and 592 for reasons other than backup. In some embodiments, parts of the traffic stream are directed to physical modules 591 and 592 to better use the bandwidth capability of the physical modules 591 and 592. In some embodiments, parts of the traffic stream are directed to physical modules 591 and 592 because parts of the traffic stream require different protocol processing and physical modules 591 and 592 have different protocol processing capabilities.

Figure 6:
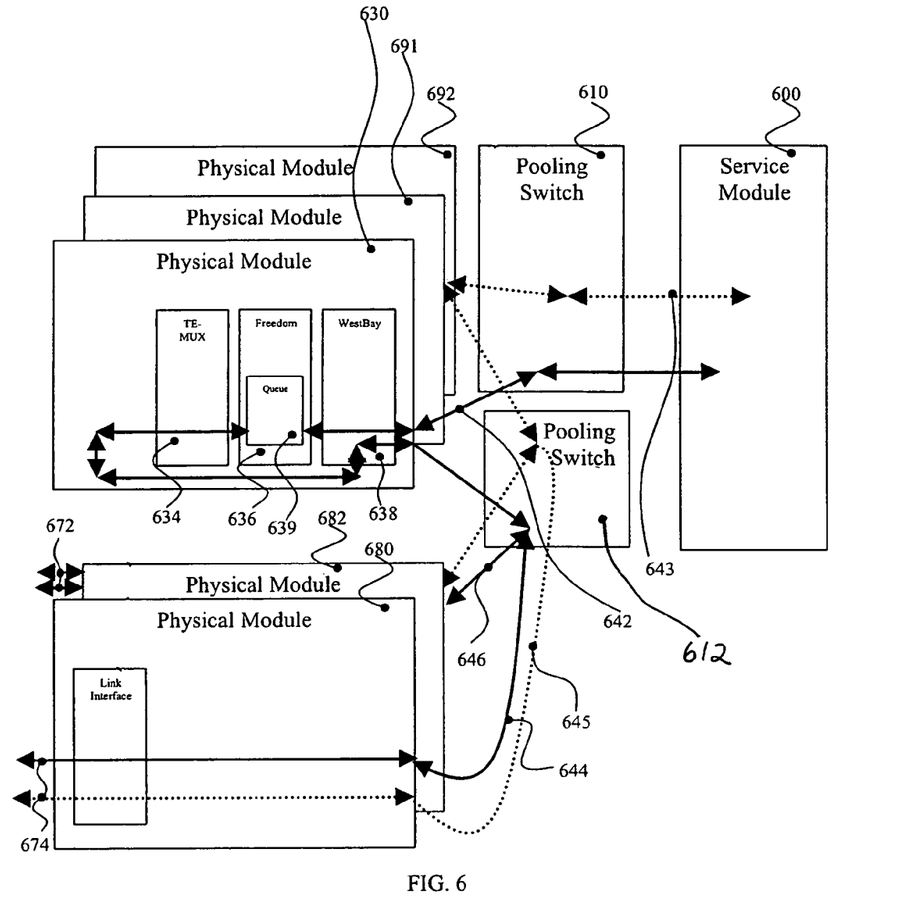
FIG. 6 is a block diagram illustrating another embodiment of an APS using a pooling switch.

FIG. 6 is a block diagram illustrating another embodiment of an APS using a pooling switch. Pooling switch 612 switches traffic between physical modules and is a part of an APS. In this embodiment, egress/ingress traffic stream 642 starts/ends in service module 600 travels through pooling switch 610 to physical module 630. This traffic is processed through the physical module and then instead of being output to a egress/ingress link, the traffic is sent/received to a second pooling switch 612. The physical module 630 has no link interface module such as an optical or electrical interface. The second pooling switch 612 directs the traffic stream to/from both physical module 682 and physical module 680. The egress/ingress traffic stream 646 travels through physical module 682 and finally through egress/ingress links 672. The egress/ingress traffic stream 644 travels through physical module 680 and finally through egress/ingress links 674. Similarly, egress/ingress traffic stream 643 starts/ends in service module 600 travels through pooling switch 610 to physical module 691. This traffic is processed through the physical module and then instead of being output to a egress/ingress link from the link interface in physical module 691, the traffic is sent/received to a second pooling switch 612. The second pooling switch 612 directs the traffic stream to/from both physical module 682 and physical module 680. Egress/ingress traffic stream 647 travels through physical module 682 and finally through egress/ingress links 672. Egress/ingress traffic stream 645 travels through physical module 680 and finally through egress/ingress links 674. In another embodiment, the two pooling switches 610 and 612 are combined into one physical switch that can perform both functions.

In some embodiments, pooling switch 612 helps to utilize physical module resources efficiently. For example, egress/ingress traffic stream 644 could be directed, on a granularity of a smaller logical unit (e.g. STS-1 frame), by pooling switch 612 to different physical modules (e.g. physical module 630, 691, and 692). Different physical modules (e.g. 630, 691, and 692) can be used to process parts of the traffic stream coming across one egress/ingress link.

In some embodiments, pooling switch 612 helps to utilize physical module resources based on different protocols or different densities. Different physical modules may process different protocols more efficiently than others, and the pooling switch can be used to direct the protocols accordingly. Different physical modules may have different bandwidth capabilities, and the pooling switch can be used to direct traffic according to what might be the most efficient use of the hardware in the modules.

In some embodiments, pooling switch 612 can also be used to provide 1:N redundancy for traffic streams where the traffic, upon a failure, would be directed to the physical module devoted to providing back-up.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting a protected egress link including:
    connecting traffic from a service module to a first physical module having a link layer framer that is connected via a link interface of the first physical module to the protected egress link, wherein the link layer framer includes a queue for storing the traffic; and
    connecting the traffic input to the link interface of the first physical module through a pooling switch to a second physical module that is connected via a link interface of the second physical module to an alternate egress link, wherein the traffic in the second physical module is not processed through a link layer framer of the second physical module but is processed through the link layer framer of the first physical module.

2. A method of protecting a protected egress link as in claim 1, wherein the link interface of the first physical module comprises an optical link interface module.

3. A method of protecting a protected egress link as in claim 1, wherein the link interface of the second physical module comprises an optical link interface module.

4. A method of protecting a protected egress link as in claim 1, wherein the link interface of the first physical module comprises an electrical link interface module.

5. A method of protecting a protected egress link as in claim 1, wherein the link interface of the second physical module comprises an electrical link interface module.

6. A method of protecting a protected egress link as in claim 1, wherein the first physical module comprises a module that places the traffic in proper form for a pooling switch.

7. A method of protecting a protected egress link as in claim 1, wherein the second physical module comprises a module that places the traffic in proper form for a pooling switch.

8. A method of protecting a protected egress link as in claim 1, wherein the traffic through the protected egress link and the alternate egress link have a synchronization difference smaller than 50 ms.

9. A method of protecting a protected egress link as in claim 1, wherein the traffic through the protected egress link and the alternate egress link behave in a manner to the user as if there is no synchronization difference between the two traffic flows.

10. A method of protecting a protected egress link as in claim 1, wherein the pooling switch enables multiple logical streams to be included in one physical interface.

11. A method of protecting a protected egress link as in claim 1, wherein the pooling switch is a packet switch.

12. A method of protecting a protected egress link as in claim 1, wherein pooling switch is a time division multiplexing switch.

13. A method of protecting a protected ingress link including:
    connecting traffic to a service module from a first physical module having a link layer framer that is connected via a link interface of the first physical module to the protected ingress link, wherein the link layer framer includes a queue for storing the traffic; and
    connecting the traffic through a second physical module that is connected via a link interface of the second physical module to an alternate ingress link through a pooling switch to the link interface of the first physical module, wherein the traffic in the second physical module is not processed through a link layer framer of the second physical module but is processed through the link layer framer of the first physical module in the event that the traffic through the second physical module from the alternate ingress link is selected to be used.

14. A method of protecting a protected egress link as in claim 13, wherein the service module decides from information within an input traffic stream to the service module where to output the input traffic stream.

15. A method of protecting a protected ingress link as in claim 13, wherein the link interface of the first physical module comprises an optical link interface module.

16. A method of protecting a protected ingress link as in claim 13, wherein the link interface of the second physical module comprises an optical link interface module.

17. A method of protecting a protected ingress link as in claim 13, wherein the link interface of the first physical module comprises an electrical link interface module.

18. A method of protecting a protected ingress link as in claim 13, wherein the link interface of the second physical module comprises an electrical link interface module.

19. A method of protecting a protected ingress link as in claim 13, wherein the first physical module contains a module that places the traffic in proper form for a pooling switch.

20. A method of protecting a protected ingress link as in claim 13, wherein the second physical module contains a module that places the traffic in proper form for a pooling switch.

21. A method of protecting a protected ingress link as in claim 13, wherein the traffic through the protected ingress link and the alternate ingress link have a synchronization difference smaller than 50 ms.

22. A method of protecting a protected ingress link as in claim 13, wherein the traffic through the protected ingress link and the alternate ingress link behave in a manner to the user as if there is no synchronization difference between the two traffic flows.

23. A method of protecting a protected ingress link as in claim 13, wherein the pooling switch enables multiple logical streams to be included in one physical interface.

24. A method of protecting a protected ingress link as in claim 13, wherein the pooling switch is a packet switch.

25. A method of protecting a protected ingress link as in claim 13, wherein pooling switch is a time division multiplexing switch.

26. A method of protecting a protected egress link including:
   connecting traffic from a service module to a first pooling switch;
   connecting the first pooling switch to a first physical module having a link layer framer that is connected via a link interface of the first physical module to the protected egress link, wherein the link layer framer includes a queue for storing the traffic; and
   connecting the traffic input to the link interface of the first physical module through a second pooling switch to a second physical module that is connected via a link interface of the second physical module to an alternate egress link, wherein the traffic in the second physical module is not processed through a link layer framer of the second physical module but is processed through the link layer framer of the first physical module.

27. A method of protecting a protected ingress link including:
   connecting traffic to a service module from a first pooling switch;
   connecting the first pooling switch to a first physical module having a link layer framer that is connected via a link interface of the first physical module to the protected ingress link, wherein the link layer framer includes a queue for storing the traffic; and
   connecting the traffic through a second physical module that is connected via a link interface of the second physical module to an alternate ingress link through a second pooling switch to the link interface of the first physical module, wherein the traffic in the second physical module is not processed through a link layer framer of the second physical module but is processed through the link layer framer of the first physical module in the event that the traffic through the second physical module from the alternate ingress link is selected to be used.

28. A method of protecting a protected egress link including:
   connecting traffic from a service module to a first pooling switch;
   connecting the first pooling switch to a first physical module having a link layer framer, wherein the link layer framer includes a queue for storing the traffic;
   connecting the traffic through the first physical module through a second pooling switch to a second physical module that is connected via a link interface of the second physical module to a protected egress link, wherein the traffic in the second physical module is not processed through a link layer framer of the second physical module but is processed by the link layer framer of the first physical module; and
   connecting the traffic through the first physical module through the second pooling switch to a third physical module that is connected via a link interface of the third physical module to an alternate egress link, wherein the traffic in the third physical module is not processed through a link layer framer of the third physical module but is processed by the link layer framer of the first physical module.

29. A method of protecting a protected egress link as in claim 28, wherein the first physical module does not include a link interface module.

30. A method of protecting a protected egress link as in claim 28, wherein 1:N protection is provided.

31. A method of protecting a protected ingress link including:
   connecting traffic to a service module from a first pooling switch;
   connecting the first pooling switch to a first physical module having a link layer framer, wherein the link layer framer includes a queue for storing the traffic;
   connecting the traffic through a second physical module that is connected via a link interface of the second physical module to a protected ingress link through a second pooling switch to the first physical module, wherein the traffic in the second physical module is not processed through a link layer framer of the second physical module but is processed by the link layer framer of the first physical module; and
   connecting the traffic through a third physical module that is connected via a link interface of the third physical module to an alternate ingress link through the second pooling switch to the first physical module, wherein the traffic in the third physical module is not processed through a link layer framer of the third physical module but is processed by the link layer framer of the first physical module.

32. A method of protecting a protected ingress link as in claim 31, wherein the first physical module does not include a link interface module.

33. A method of protecting a protected ingress link as in claim 31, wherein 1:N protection is provided.

34. A system for protecting a protected egress link including:
   a service module;
   a first physical module, wherein the first physical module comprises a link layer framer that is connected via a link interface to the protected egress link, and wherein the link layer framer includes a queue for storing traffic, and wherein traffic is connected from the service module to the first physical module;
   a pooling switch; and
   a second physical module, wherein the second physical module is connected via a link interface of the second physical module to an alternate egress link, and wherein traffic in the second physical module is not processed through a link layer framer of the second physical module but is processed through a link layer framer of the first physical module, and wherein traffic input to the link interface of the first physical module through the polling switch to the second physical module.

35. A system for protecting a protected egress link as in claim 34, wherein the link interface of the first physical module comprises an optical link interface module.

36. A system for protecting a protected egress link as in claim 34, wherein the link interface of the second physical module comprises an optical link interface module.

37. A system for protecting a protected egress link as in claim 34, wherein the link interface of the first physical module comprises an electrical link interface module.

38. A system for protecting a protected egress link as in claim 34, wherein the link interface of the second physical module comprises an electrical link interface module.

39. A system for protecting a protected egress link as in claim 34, wherein the first physical module comprises a module that places the traffic in proper form for a pooling switch.

40. A system for protecting a protected egress link as in claim 34, wherein the second physical module comprises a module that places the traffic in proper form for a pooling switch.

41. A system for protecting a protected egress link as in claim 34, wherein the traffic through the protected egress link and the alternate egress link have a synchronization difference smaller than 50 ms.

42. A system for protecting a protected egress link as in claim 34, wherein the traffic through the protected egress link and the alternate egress link behave in a manner to the user as if there is no synchronization difference between the two traffic flows.

43. A system for protecting a protected egress link as in claim 34, wherein the pooling switch enables multiple logical streams to be included in one physical interface.

44. A system for protecting a protected egress link as in claim 34, wherein the pooling switch is a packet switch.

45. A system for protecting a protected egress link as in claim 34, wherein pooling switch is a time division multiplexing switch.

46. A system for protecting a protected ingress link including:
   a service module;
   a first physical module, wherein the first physical module comprises a link layer framer that is connected via a link interface to the protected ingress link, and wherein the link layer framer includes a queue for storing traffic, and wherein traffic is connected from the service module to the first physical module;
   a pooling switch; and
   a second physical module, wherein the second physical module is connected via a link interface of the second physical module to an alternate ingress link, and wherein traffic in the second physical module is not processed through a link layer framer of the second physical module but is processed through a link layer framer of the first physical module in the event that the traffic through the second physical module from the alternate ingress link is selected to be used, and wherein traffic is connected through the second physical module.

47. A system for protecting a protected egress link as in claim 46, wherein the service module decides from information within an input traffic stream to the service module where to output the input traffic stream.

48. A system for protecting a protected egress link as in claim 46, wherein the link interface of the first physical module comprises an optical link interface module.

49. A system for protecting a protected egress link as in claim 46, wherein the link interface of the second physical module comprises an optical link interface module.

50. A system for protecting a protected egress link as in claim 46, wherein the link interface of the first physical module comprises an electrical link interface module.

51. A system for protecting a protected egress link as in claim 46, wherein the link interface of the second physical module comprises an electrical link interface module.

52. A system for protecting a protected egress link as in claim 46, wherein the first physical module contains a module that places the traffic in proper form for a pooling switch.

53. A system for protecting a protected egress link as in claim 46, wherein the second physical module contains a module that places the traffic in proper form for a pooling switch.

54. A system for protecting a protected egress link as in claim 46, wherein the traffic through the protected ingress link and the alternate ingress link have a synchronization difference smaller than 50 ms.

55. A system for protecting a protected egress link as in claim 46, wherein the traffic through the protected ingress link and the alternate ingress link behave in a manner to the user as if there is no synchronization difference between the two traffic flows.

56. A system for protecting a protected egress link as in claim 46, wherein the pooling switch enables multiple logical streams to be included in one physical interface.

57. A system for protecting a protected egress link as in claim 46, wherein the pooling switch is a packet switch.

58. A system for protecting a protected egress link as in claim 46, wherein pooling switch is a time division multiplexing switch.

59. A system for protecting a protected egress link including:
   a service module;
   a first pooling switch, wherein traffic is connected from the service module to the first pooling switch;
   a first physical module, wherein the first pooling switch is connected to the first physical module having a link layer framer that is connected via a link interface of the first physical module to the protected egress link, wherein the link layer framer includes a queue for storing the traffic; and
   a second pooling switch;
   a second physical module, wherein the traffic input to the link interface of the first physical module is connected through the second pooling switch to the second physical module that is connected via a link interface of the second physical module to an alternate egress link, wherein the traffic in the second physical module is not processed through a link layer framer of the second physical module but is processed through the link layer framer of the first physical module.

60. A system for protecting a protected ingress link including:
   a service module;
   a first pooling switch, wherein traffic is connected to the service module from the first pooling switch;
   a first physical module, wherein the first pooling switch is connected to a first physical module having a link layer framer that is connected via a link interface of the first physical module to the protected ingress link, wherein the link layer framer includes a queue for storing the traffic; and
   a second physical module, wherein the traffic is connected through the second physical module that is connected via a link interface of the second physical module to an alternate ingress link through a second pooling switch to the link interface of the first physical module, wherein the traffic in the second physical module is not processed through a link layer framer of the second physical module but is processed through the link layer framer of the first physical module in the event that the traffic through the second physical module from the alternate ingress link is selected to be used.

61. A system for protecting a protected egress link including:
- a service module;
- a first pooling switch, wherein traffic is connected from a service module to a first pooling switch;
- a first physical module, wherein the first pooling switch is connected to the first physical module having a link layer framer, wherein the link layer framer includes a queue for storing the traffic;
- a second pooling switch, wherein the traffic is connected through the first physical module through the second pooling switch to a second physical module that is connected via a link interface of the second physical module to a protected egress link, wherein the traffic in the second physical module is not processed through a link layer framer of the second physical module but is processed by the link layer framer of the first physical module; and
- a third physical module, wherein connecting the traffic is connected through the first physical module through the second pooling switch to the third physical module that is connected via a link interface of the third physical module to an alternate egress link, wherein the traffic in the third physical module is not processed through a link layer framer of the third physical module but is processed by the link layer framer of the first physical module.

62. A system for protecting a protected egress link as in claim 61, wherein the first physical module does not include a link interface module.

63. A system for protecting a protected egress link as in claim 61, wherein 1:N protection is provided.

64. A system for protecting a protected ingress link including:
- a service module;
- a first pooling switch, wherein traffic is connected to the service module from the first pooling switch;
- a first physical module, wherein the first pooling switch is connected to the first physical module having a link layer framer, wherein the link layer framer includes a queue for storing the traffic;
- the second physical module, wherein the traffic is connected through the second physical module that is connected via a link interface of the second physical module to a protected ingress link through a second pooling switch to the first physical module, wherein the traffic in the second physical module is not processed through a link layer framer of the second physical module but is processed by the link layer framer of the first physical module; and
- a third physical module, wherein the traffic is connected through the third physical module that is connected via a link interface of the third physical module to an alternate ingress link through the second pooling switch to the first physical module, wherein the traffic in the third physical module is not processed through a link layer framer of the third physical module but is processed by the link layer framer of the first physical module.

65. A system for protecting a protected ingress link as in claim 64, wherein the first physical module does not include a link interface module.

66. A system for protecting a protected ingress link as in claim 64, wherein 1:N protection is provided.

\* \* \* \* \*